(12) United States Patent
Pearson et al.

(10) Patent No.: US 11,938,414 B1
(45) Date of Patent: Mar. 26, 2024

(54) MICROFLUIDIC FILM EVAPORATION WITH FEMTOSECOND LASER-PATTERNED SURFACE

(71) Applicant: Honeywell Federal Manufacturing & Technologies, LLC, Kansas City, MO (US)

(72) Inventors: Connor Daniel Pearson, Overland Park, KS (US); Sabrina Marie Wells Torres, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/296,863

(22) Filed: Apr. 6, 2023

Related U.S. Application Data

(60) Provisional application No. 63/413,081, filed on Oct. 4, 2022.

(51) Int. Cl.
*B01D 1/22* (2006.01)
*B01L 3/00* (2006.01)

(52) U.S. Cl.
CPC ........ *B01D 1/221* (2013.01); *B01L 3/502707* (2013.01); *B01D 2202/10* (2013.01)

(58) Field of Classification Search
CPC ................ B01D 1/221; B01D 2202/10; B01L 3/502707
See application file for complete search history.

(56) References Cited

U.S. PATENT DOCUMENTS

| | | | |
|---|---|---|---|
| 7,586,601 B2 * | 9/2009 | Ebstein | B81B 1/006 356/244 |
| 7,618,027 B2 * | 11/2009 | Spiegelman | B01B 1/005 261/DIG. 65 |
| 9,362,201 B2 * | 6/2016 | Gavillet | F28D 15/046 |
| 10,751,666 B2 * | 8/2020 | Chardon | B01D 5/0006 |
| 11,198,129 B2 * | 12/2021 | Huff | B01L 3/502715 |
| 2003/0224531 A1 * | 12/2003 | Brennen | B01L 3/5027 436/180 |
| 2011/0075372 A1 * | 3/2011 | Zimbeck | F28D 15/046 29/890.032 |
| 2013/0077943 A1 * | 3/2013 | Muller | B01B 1/005 392/391 |
| 2018/0126381 A1 * | 5/2018 | Huff | B01L 3/502715 |
| 2019/0319152 A1 | 10/2019 | Guo et al. | |
| 2023/0166253 A1 * | 6/2023 | Torres | B01F 33/30 422/503 |

* cited by examiner

*Primary Examiner* — Jonathan Miller
(74) *Attorney, Agent, or Firm* — Erise IP, P.A.

(57) ABSTRACT

Systems, apparatuses, and methods for microfluidic fluid evaporation using femtosecond laser-patterned surfaces are disclosed. A microfluidic device may comprise a femtosecond laser-patterned substrate having at least one input path and at least one output path. The femtosecond laser-patterned substrate may comprise both superhydrophobic and superhydrophilic sections. Fluid deposited at an input path may be wicked to an output path due to the surface pattern. A heating device may be provided to heat the fluid to evaporate volatiles therefrom. Vacuums and gas streams may be used to aid in volatile removal. Gas streams may add gas to the microfluidic device to react with the fluid.

20 Claims, 6 Drawing Sheets

US 11,938,414 B1

MICROFLUIDIC FILM EVAPORATION WITH FEMTOSECOND LASER-PATTERNED SURFACE

CROSS-REFERENCE TO RELATED APPLICATIONS

This non-provisional patent application claims priority benefit, with regard to all common subject matter, of earlier-filed U.S. Provisional Patent Application No. 63/413,081, filed Oct. 4, 2022, and entitled "MICROFLUIDIC FILM EVAPORATION WITH FEMTOSECOND LASER-PATTERNED SURFACE." The identified '081 provisional patent application is hereby incorporated by reference in its entirety into the present application.

STATEMENT OF GOVERNMENTAL SUPPORT

This invention was made with government support under DE-NA-0002839 awarded by the United States Department of Energy/National Nuclear Security Administration. The government has certain rights in the invention.

BACKGROUND

1. Field

Embodiments of the present disclosure relate to microfluidics. More specifically, embodiments of the present disclosure relate to systems and methods for microfluidic film evaporation via femtosecond laser-patterned surfaces for removal of volatiles.

2. Related Art

Microfluidic devices are often used in flow chemistry, wherein chemicals are either mixed or separated. Current methods of mixing employ either passive or active means of mixing. In passive mixing, no external sources are used. Thus, mixing typically relies on the microfluidic chip geometry and on fluid properties. Under laminar flow, which is the typical fluid regime in microfluidics, mixing mostly happens through diffusion. This property allows one to perform mixing using lamination: two or more fluids are flowing in parallel, allowing for diffusion to happen. In a flow chemistry process, it is often desirable to remove volatiles from a fluid. Flow chemistry is typically performed on a benchtop using microfluidic devices. However, volatile removal devices are often large and do not fit into the workflow of benchtop flow chemistry.

Microfluidic devices utilize surface wettability properties to induce capillary action in fluids. Surfaces exhibiting a water contact angle below 90° are considered hydrophilic surfaces, while those surfaces with a water contact angle greater than 90° are considered hydrophobic surfaces. Superhydrophobic surfaces have water contact angles above 150°, and superhydrophilic surfaces have water contact angles of about 0°.

Thin-film evaporators are used to evaporate components from a fluid. The thin-film evaporators are typically tubular devices in which a fluid is distributed over the inner surface of the device by mechanical means, such as a rotor. Heat is applied to the device to evaporate volatiles from the fluid. Thin-film evaporators suffer from mechanical wear due to the mechanical mixing means. Furthermore, thin-film evaporators are typically unable to have a form factor or throughput that is conducive to development processes that are designed for larger flow rates.

What is needed are systems, methods, and apparatuses for microfluidic fluid evaporation via femtosecond laser-patterned surfaces that are capable of running in a confined space, such as a fume hood, and operating at a low flowrate.

SUMMARY

Embodiments of the present disclosure solve the above-mentioned problems by providing systems and methods for microfluidic fluid evaporation via femtosecond laser-patterned surfaces. In some embodiments, a system for microfluidic fluid evaporation comprises a femtosecond laser-patterned substrate having one or more inlets and one or more outlets extending between the one or more inlets and the one or more outlets. The femtosecond laser-patterned substrate may comprise hydrophobic, hydrophilic, superhydrophobic, superhydrophilic regions, or any combination thereof. Fluid deposited at an input path may be wicked to an output path due to the patterning of the substrate. A heating device may heat the surface to evaporate volatiles from the fluid. Multiple fluids and/or gasses may be added to the system for chemical reactions. As one example, the systems and methods described herein may be useful for microreactor processes in which a thin film of fluid assists with mass transfer between the gas phase and the liquid phase.

In some aspects, the techniques described herein relate to a system for microfluidic film evaporation, the system including: at least one fluid; a femtosecond laser-patterned substrate, including: one or more input paths; and one or more output paths, wherein the femtosecond laser-patterned substrate causes the at least one fluid to wick from the one or more input paths to the one or more output paths; and a heating device for heating the femtosecond laser-patterned substrate, thereby evaporating volatiles from the at least one fluid.

In some aspects, the techniques described herein relate to a system, wherein the femtosecond laser-patterned substrate includes at least one of a superhydrophobic region or a superhydrophilic region.

In some aspects, the techniques described herein relate to a system, wherein the femtosecond laser-patterned substrate is formed from a material selected from the group consisting of: glass, silicon nitride, and stainless steel.

In some aspects, the techniques described herein relate to a system, wherein the system further includes a vacuum for removing volatiles from the femtosecond laser-patterned substrate.

In some aspects, the techniques described herein relate to a system, wherein the system further includes a gas stream to add gas to the femtosecond laser-patterned substrate to react with the at least one fluid.

In some aspects, the techniques described herein relate to a system, wherein the at least one fluid includes a first fluid and a second fluid, and wherein the one or more input paths includes a first input path configured to wick the first fluid and a second input path configured to wick the second fluid, and wherein the femtosecond laser-patterned substrate is patterned to connect the first input path to the second input path to mix the first fluid with the second fluid.

In some aspects, the techniques described herein relate to a system, wherein the femtosecond laser-patterned substrate is at least partially surrounded by an exterior surface, and wherein the exterior surface includes a wetting property distinct from a wetting property of the femtosecond laser-patterned substrate.

In some aspects, the techniques described herein relate to a system, wherein the femtosecond laser-patterned substrate is a first femtosecond laser-patterned substrate, and wherein the one or more output paths are configured to feed into one or more input paths of a second femtosecond laser-patterned substrate.

In some aspects, the techniques described herein relate to a system, wherein the femtosecond laser-patterned substrate is a first femtosecond laser-patterned substrate, and wherein the system further includes: a second femtosecond laser-patterned substrate and a third femtosecond laser-patterned substrate, and wherein the one or more output paths of the first femtosecond laser-patterned substrate and one or more output paths of the second femtosecond laser-patterned substrate are fluidly connected to one or more input paths of the third femtosecond laser-patterned substrate.

In some aspects, the techniques described herein relate to a system, wherein the femtosecond laser-patterned substrate includes a first side wall opposite a second side wall, wherein the first side wall and the second side wall are angled to converge to form the one or more output paths.

In some aspects, the techniques described herein relate to a method for microfluidic film evaporation for removal of volatiles, including: providing at least one femtosecond laser-patterned substrate, including: one or more input paths; and one or more output paths, wherein the at least one femtosecond laser-patterned substrate is patterned to wick a fluid from the one or more input paths to the one or more output paths; and providing heating for the at least one femtosecond laser-patterned substrate to heat the fluid and evaporate volatiles therefrom.

In some aspects, the techniques described herein relate to a method, further including providing a vacuum to remove volatiles from the at least one femtosecond laser-patterned substrate.

In some aspects, the techniques described herein relate to a method, further including providing a gas stream, the gas stream coupled to the at least one femtosecond laser-patterned substrate to add gas thereto and react with the fluid.

In some aspects, the techniques described herein relate to a method, wherein the fluid is a first fluid, and wherein at least one of the one or more output paths are fluidly connected to one or more input paths of an additional substrate, the additional substrate including a second fluid for mixing with the first fluid.

In some aspects, the techniques described herein relate to a microfluidic film evaporation system, including: at least one fluid; a fluid input path; a volatiles outlet; a fluid output path; a cylindrical femtosecond laser-patterned surface extending between the fluid input path and the fluid output path, wherein the cylindrical femtosecond laser-patterned surface wicks the at least one fluid from the fluid input path to the fluid output path; and a heating coil coupled to an exterior of the cylindrical femtosecond laser-patterned surface, wherein, when the at least one fluid is heated by the heating coil, volatiles are evaporated therefrom and removed via the volatiles outlet.

In some aspects, the techniques described herein relate to a microfluidic film evaporation system, wherein the microfluidic film evaporation system further includes a vacuum coupled to the volatiles outlet to remove the volatiles via the volatiles outlet.

In some aspects, the techniques described herein relate to a microfluidic film evaporation system, wherein the cylindrical femtosecond laser-patterned surface includes a superhydrophobic section.

In some aspects, the techniques described herein relate to a microfluidic film evaporation system, wherein the cylindrical femtosecond laser-patterned surface includes a superhydrophilic section.

In some aspects, the techniques described herein relate to a microfluidic film evaporation system, wherein the cylindrical femtosecond laser-patterned surface is vertically-oriented such that gravity pulls the at least one fluid from the fluid input path to the fluid output path.

In some aspects, the techniques described herein relate to a microfluidic film evaporation system, further including: a gas stream coupled to a channel of the cylindrical femtosecond laser-patterned surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
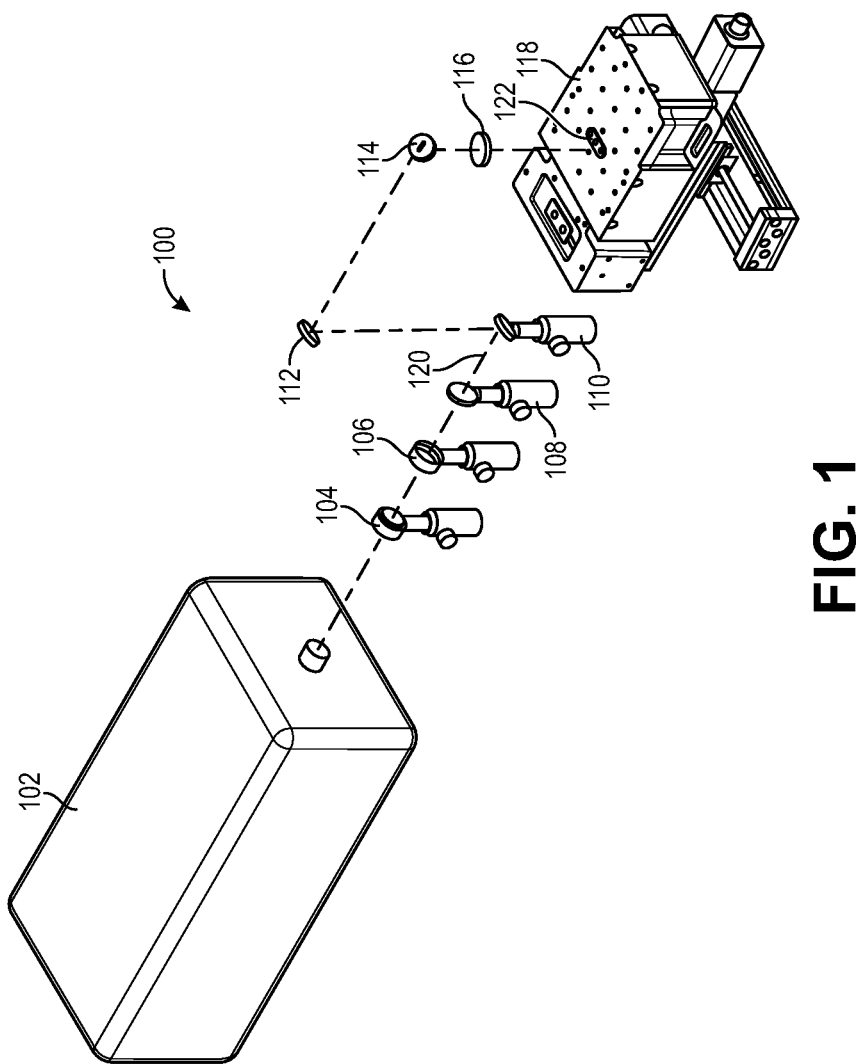
FIG. 1 illustrates an exemplary femtosecond laser-patterning system for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claims. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments described herein are generally directed to systems and methods for microfluidic film evaporation via femtosecond laser-patterned surfaces. A fluid may be fed onto a femtosecond laser-patterned substrate whereby the fluid is wicked into a thin film. The substrate may comprise one or more input channels and one or more output channels with a central section extending therebetween. A heating device may be provided for heating the femtosecond laser-patterned surface. As such, as the fluid is wicked across the femtosecond laser-patterned substrate, the heating device may heat the fluid to evaporate volatiles therefrom. In some embodiments, a vacuum and/or a gas stream is used to remove and/or collect the evaporated volatiles from the system. In some embodiments, the gas stream is configured to add gas to the fluid before, during, or after evaporation of the volatiles to react with the fluid. In some embodiments, the substrate comprises a columnar shape, with the inner surface thereof comprising the femtosecond laser-patterned surface. The laser-patterned surfaces described herein may increase the heat transfer and, therefore, the efficiency at which volatiles are released from fluids in a microreactor device FIG. 1 illustrates a laser system, for example an ultra-short pulse, single-pulse laser system 100, configured to perform laser engraving on a substrate. In some embodiments, an ultra-short pulse, dual-pulse laser system may be used. Features and structures illustrated include a light source 102, shutter 104, half-wave plate 106, polarizer 108, first mirror 110, second mirror 112, third mirror 114, lens 116, and translation stage 118. Embodiments of the present disclosure may incorporate any or all of the features and structures illustrated and may include additional features or structures not illustrated in FIG. 1. In some embodiments, single pulse laser system 100 comprises a femtosecond laser. Use of a femtosecond pulse laser reduces microcracks and crystalline changes and works with thin films. A femtosecond (10-15 fs) pulse is over before energy is transferred to ions.

In FIG. 1, a beam of light is generated at light source 102 using an emitter, such as an ultrashort, femtosecond pulsed laser emitter. Light source 102 may be coupled to a computer (not shown) and/or a power source, such as a battery or wall outlet. In some embodiments, shutter 104 may fluctuate the timing of light pulses from light source 102. For example, shutter 104 may be configured to open and close within the femtosecond range. The light source is incident into a single mode fiber using half-wave plate 106 and polarizer 108. The generated beam from the single mode fiber constitutes a source beam 120. The source beam 120, in some embodiments, may be reflected using one or more of first mirror 110, second mirror 112, or third mirror 114. The one or more mirrors may be used to redirect the source beam 120, such that source beam 120 directly or incidentally lands on translation stage 118. Following redirection by the one or more mirrors, source beam 120 is focused using lens 116, such that the convergence of source beam 120 is near a substrate 122 on translation stage 118. Translation stage 118 allows for movement of substrate 122 along the x-axis, y-axis, and z-axis. In some embodiments, translation stage 118 may be connected to and controlled remotely, such as by a computer.

Movement of substrate 122 may allow laser system 100 to engrave specific patterns onto substrate 122. In some embodiments, substrate 122 is engraved with a plurality of microchannels through which fluid flows. Channel walls of the channels may be laser-patterned to alter the wettability characteristics thereof and the flow rate of fluids through the channel. For example, the channel walls may be engraved to be hydrophilic such that water is wicked through the channels.

In some embodiments, engraving of the substrate may comprise engraving one or more input paths as well as one or more output paths. The input paths and/or output paths may be configured, in some embodiments, to fluidly connect to other external components for the process of flow chemistry or paths of other substrates, as discussed below. For example, external components may include tubing, plates, microfluidic devices, containers, tanks, bottles, syringes, etc. In some embodiments, the input paths and/or output paths may be configured to connect to a pressurized source, such as pressurized air. In some embodiments, the input paths and/or output paths may be configured to connect to a vacuum. In some embodiments, the input paths and/or output paths may be configured to connect to a gas stream, such as a nitrogen gas stream. In some embodiments, pressurized air or vacuum may be used to aid in the flow of fluid through the microfluidic device.

In some embodiments, a femtosecond laser-patterned surface comprises a plurality of parallel channels engraved in a direction to aid in wicking fluid in the engraved direction. The channels may be between about 1 μm to about 50 μm wide. In some embodiments, parallel channels may be between about 50 μm to about 100 μm wide. In some embodiments, parallel channels may be between about 100 μm to about 500 μm wide. In some embodiments, parallel channels may be between about 500 μm to about 2 mm wide.

Figure 2A:
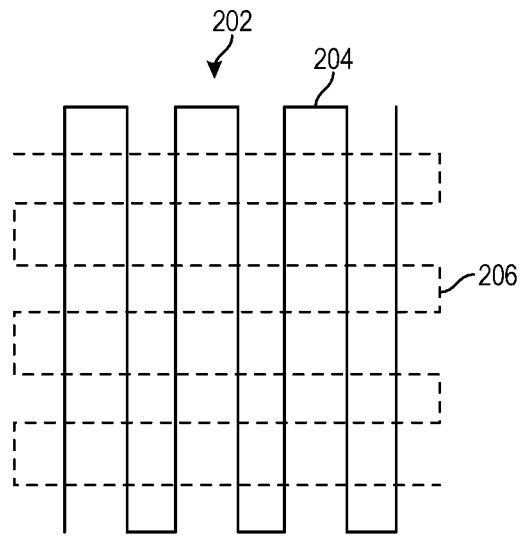
FIG. 2A illustrates an exemplary femtosecond laser-patterned surface for some embodiments.
Figure 2B:
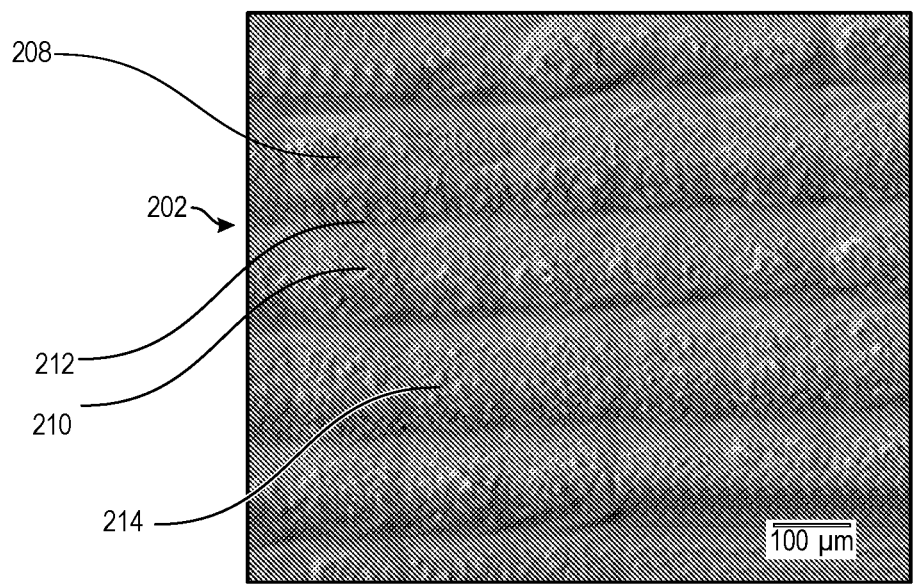
FIG. 2B illustrates a standard electron microscope scan of FIG. 2A.

FIGS. 2A and 2B illustrate exemplary engravings made on a substrate using laser system 100 for some embodiments. FIG. 2A is a depiction of an overall line scan 202 comprising a first scan 204 and a second scan 206, and FIG. 2B is an SEM (scanning electron microscope) image. As depicted, first scan 204 is conducted along the y-axis while second scan 206 is conducted along the x-axis. The resulting microstructure of the material is shown in the SEM image (FIG. 2B), which comprises peaks 208, troughs 210, channels 212, and pyramidal protrusions 214. As described above, adjacent peaks 208, with a trough 210 therebetween form a channel 212.

In some embodiments, the substrate is patterned with pyramidal protrusions 214 (formed on peaks 208), which are one type of microstructure that may improve hydrophilic or hydrophobic properties of the substrate chosen for the microfluidic device. For example, larger pyramidal protrusions 214 (i.e., formed by deeper and/or wider troughs 210) may provide hydrophilic or superhydrophilic properties by allowing the fluid to wick between the pyramidal protrusions 214 and diffuse quickly through the processed surfaces. Such qualities may be advantageous for some purposes of microfluidic devices, such as passive mixing of fluids, as discussed further below. Pyramidal protrusions 214 may also be used to separate mixtures of differing compositions. For example, a heterogeneous mixture comprising a hydrophilic and an oil hydrophobic, may be separated by exposing it to a hydrophilic microstructure, such as described above, which would naturally absorb and wick away the hydrophilic while leaving the hydrophobic behind. Various other microstructures may be used in accordance with embodiments described herein. The microstructures may be formed by laser system 100 to provide the femtosecond laser-patterned surface with hydrophilic and hydrophobic properties. The below-described systems may comprise femtosecond laser-patterned surfaces which may be formed with various surface characteristics to enable mixing of fluids on the microfluidic device.

Figure 3A:
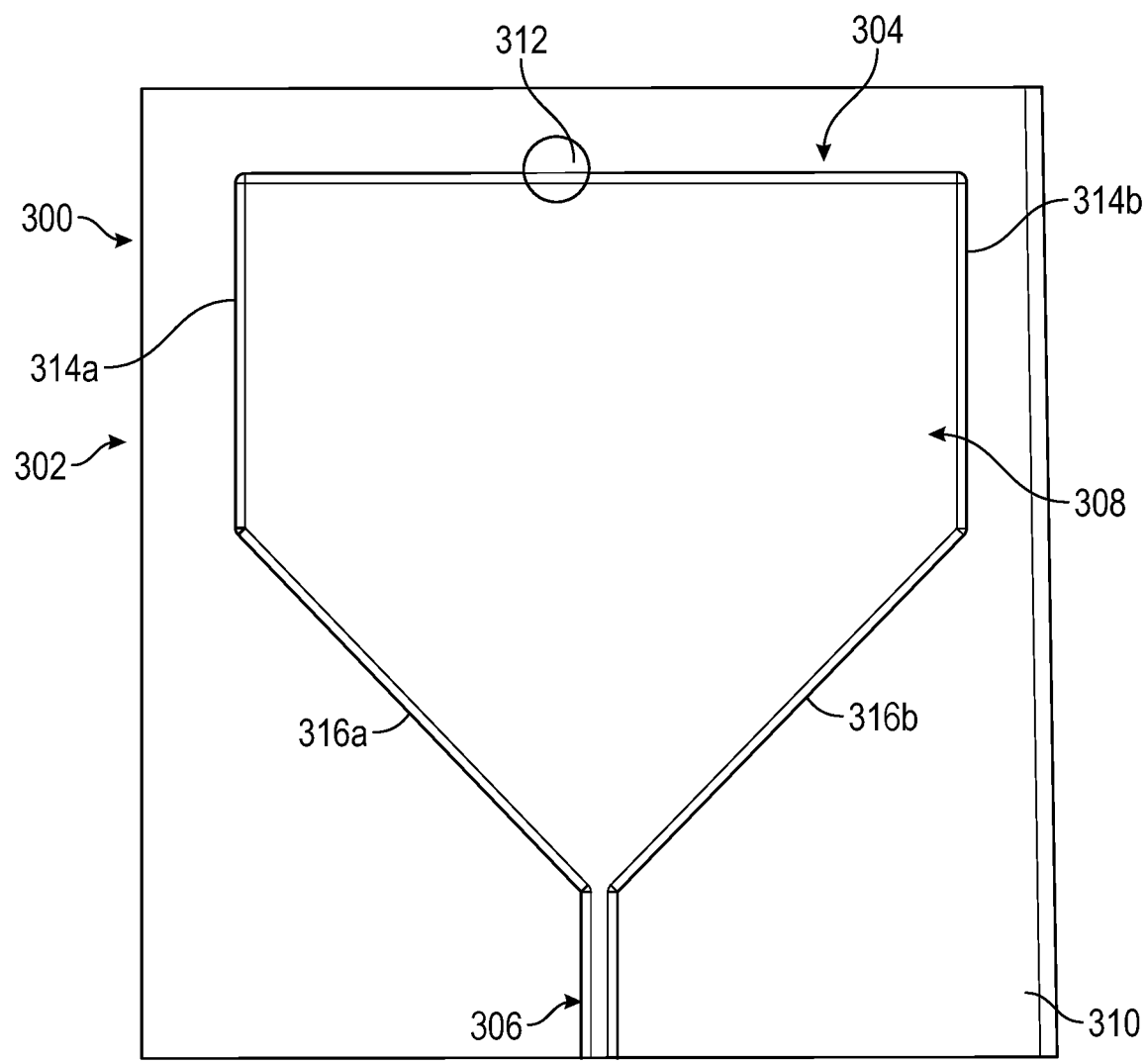
FIG. 3A illustrates a top-down view of a first system for microfluidic fluid evaporation for some embodiments.
Figure 3B:
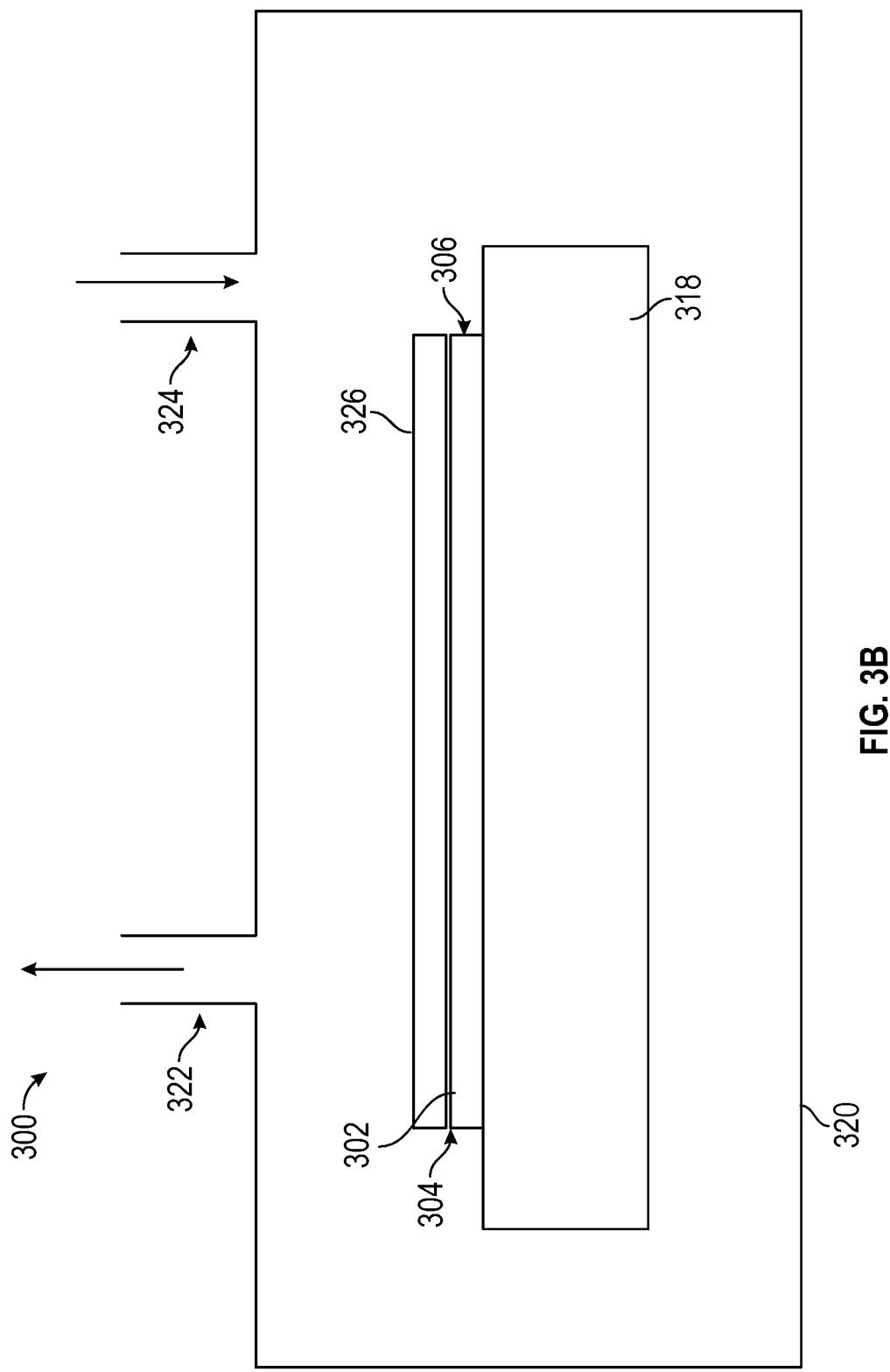
FIG. 3B illustrates a side view of the first system for some embodiments.

FIGS. 3A and 3B illustrate a top-down view and a side view, respectively, of a system 300 in accordance with some embodiments of the present disclosure. System 300 may comprise a substrate 302 having an input path 304, an output path 306, a femtosecond laser-patterned surface (FLPS) 308 extending between input path 304 and output path 306, and an exterior surface 310. In some embodiments, exterior surface 310 at least partially surrounds FLPS 308. In some embodiments, exterior surface 310 is laser-engraved to be hydrophobic, hydrophilic, superhydrophobic, or superhydrophilic. In some embodiments, exterior surface 310 is not processed such that wetting properties thereof are not altered. In some embodiments, FLPS 308 is engraved from exterior surface 310 such that FLPS 308 is recessed with respect to a top surface of exterior surface 310. As discussed further below, in some embodiments, substrate 302 comprises a plurality of input paths 304 and a plurality of output paths 306.

A fluid 312 may be deposited at input path 304, whereby the fluid 312 is wicked into a thin film across FLPS 308 and travels to output path 306. The fluid 312 may comprise one or more volatiles, which may be evaporated therefrom as discussed below. In some embodiments, fluid 312 comprises a fluid mixture and may comprise both hydrophobic and hydrophilic compounds therein. By a thin film, it is meant that the fluid 312 has a thickness in the range of nanometers to micrometers. In some embodiments, the fluid 312 is a hydrophobic compound. For example, fluid 312 may be a fluid polymerized siloxane, such as polydimethylsiloxane. In some embodiments, fluid 312 is a hydrophilic compound, such as water or ethanol. The wettability of FLPS 308 may be patterned to match that of fluid 312 such that fluid 312 wicks across FLPS 308. In embodiments, FLPS 308 reduces the contact angle with fluid 312, thereby enhancing spreading of fluid 312 across FLPS 308 and promoting heat and mass transfer.

As shown, substrate 302 comprises a pentagonal geometry, with the base of the pentagon forming input path 304 and the tip of the pentagon forming output path 306. Substrate 302 may take various geometries or configurations without departing from the scope hereof. For example, substrate 302 may be substantially rectangular and comprise multiple output paths 306, one or more of which may be fluidly connected to an input path of a different substrate 302, as discussed below with respect to FIG. 5. In some embodiments, substrate 302 is disposed on a supporting surface that is oriented at an angle such that substrate 302 is oriented at said angle. For example, substrate 302 may be placed on a supporting structure that is oriented at a 45° degree angle such that gravity pulls fluid 312 from input path 304 to output path 306.

As described above, substrate 302 may be patterned to have hydrophobic and/or hydrophilic properties. In some embodiments, substrate 302 comprises at least one superhydrophilic region. In some embodiments, substrate 302 comprises at least one superhydrophobic region. For example, a first region of FLPS 308 may be superhydrophilic for deposition of a hydrophilic fluid in the first region, and a second region of FLPS 308 may be superhydrophobic for deposition of a hydrophobic fluid in the second region. In some embodiments, FLPS 308 is hydrophobic and exterior surface 310 is hydrophilic. In some embodiments, FLPS 308 is hydrophilic, and exterior surface 310 is hydrophobic. In some embodiments, FLPS 308 and exterior surface 310 comprise substantially similar wettability characteristics. The wettability of substrate 302 may be patterned based in part on the properties of fluid 312. For example, for a hydrophobic fluid such as silicone oil, substrate 302 may be patterned to have hydrophobic properties. Similarly, for a hydrophilic fluid such as water, substrate 302 may be patterned to have hydrophilic properties. One of skill in the art will appreciate that substrate 302 may be patterned to have various arrangements of (super)hydrophobic and (super)hydrophilic portions.

In some embodiments, substrate 302 is a microfluidic chip having a plurality of channels laser-patterned therein as described above with respect to FIGS. 2A and 2B. In some embodiments, substrate 302 is a microreactor device in which chemical reactions take place. For example, embodiments described herein may be used for mass transfer in a microreactor device between the gas phase and the liquid phase. In some embodiments, substrate 302 is formed to have a plurality of channels substantially in parallel. The sizing and direction of the parallel channels 212 may determine the wettability characteristics of substrate 302. For example, the spacing of parallel channels 212 may convey hydrophilic properties, in which fluid 312 is absorbed into troughs 210 of the parallel channels 212. Meanwhile, the direction of the parallel channels 212 may cause fluid to be wicked along the axis.

In some embodiments, FLPS 308 is formed by a first side wall 314a, a second side wall 314b, a first angled wall 316a, a second angled wall 316b, input path 304, and output path 306. First side wall 314a may be parallel to second side wall 314b. A distance between first side wall 314a and second side wall 314b may define a width of input path 304. First angled wall 316a may emanate at an angle from first side wall 314a, and second angled wall 316b may emanate at an angle from second side wall 314b. In some embodiments, angled walls 316a, 316b comprise the same angle. In some embodiments, angled walls 316a, 316b are formed with distinct angles. Angled walls 316a, 316b may converge to form output path 306. While linear angled walls 316a, 316b are depicted, in some embodiments, angled walls 316a, 316b may comprise a curvature. Further, it will be appreciated that the above-described geometry of FLPS 308 is exemplary, and FLPS 308 may take various geometries without departing from the scope hereof.

The geometry of substrate 302 may be configured to obtain desired characteristics for flow chemistry processes. For example, a width of output path 306 may be increased to increase the rate at which fluid 312 wicks through substrate 302. Increasing the width of output path 306 may also reduce spillover of fluid 312 onto exterior surface 310. Similarly, output path 306 may be decreased in width to reduce the rate at which fluid 312 wicks through substrate 302. Likewise, the length of output path 306 may be increased to increase the time in which fluid 312 is in contact with substrate 302. Increasing the length of output path 306 may be advantageous when utilizing a multi-system mixing process, as discussed further below. As another example, the angle that angled walls 316a, 316b make with respect to side walls 314a, 314b may affect the speed at which fluid 312 travels across FLPS 308. Increasing the angle may increase the speed, while decreasing the angle may reduce the speed.

Substrate 302 may comprise any material suitable for femtosecond laser patterning and microfluidic devices. Forming substrate 302 from a chemically inert material may be advantageous to prevent substrate 302 from reacting with fluid 312. In some embodiments, substrate 302 comprises at least one of silicon nitride, glass (e.g., borosilicate glass), quartz, perfluorinated polymers, such as polytetrafluoroethylene, a nickel-chromium-iron-molybdenum alloy, (e.g., HASTELLOY® X), or stainless steel (e.g., 304 stainless steel). In some embodiments, the substrate material is transparent or semi-transparent to allow a user to view the flow of fluid 312 through substrate 302. It is further contemplated that substrate 302 may comprise one or more of a metal, a plastic, a metal alloy, a ceramic, or any other material known to a person skilled in the art to function as a microfluidic device.

FIG. 3B illustrates a planar view of system 300 for some embodiments. As shown, system 300 may also comprise a heating device 318 for heating substrate 302. In some embodiments, substrate 302 is placed atop heating device 318. In some embodiments, heating device 318 is a hot plate atop which substrate 302 sits such that substrate 302 is in direct contact with heating device 318. Other heating devices may be used. In some embodiments, heating device 318 is not in direct contact with substrate 302. In some embodiments, heating device 318 is an electric, an induction, or any other type of heating device. In some embodiments, heating device 318 is configured to heat fluid 312 (via heating of substrate 302) to a temperature that causes volatiles from fluid 312 to evaporate. It will be appreciated that the temperature may vary based on the fluid 312 and the temperature at which the volatiles in fluid 312 are evaporated therefrom.

System 300 may comprise a housing 320 encasing substrates 302 and heating device 318. In some embodiments, heating device 318 is not located within housing 320. In some such embodiments, heating device 318 heats housing 320, and the heat is then transferred to substrate 302. Housing 320 may be formed from any suitable material and may comprise one or more access points for coupling external devices thereto.

In some embodiments, a vacuum 322 is provided for system 300. Vacuum 322 may aid in removing the volatiles evaporated from fluid 312 when heated by heating device 318. In some embodiments, vacuum 322 is configured to remove volatiles for collection thereof. Vacuum 322 may be fluidly coupled to housing 320.

In some embodiments, system 300 comprises a gas stream 324. Gas stream 324 may aid in removing volatiles from fluid 312 and may also be used to add reactants to the fluid. In some embodiments, gas stream 324 comprises nitrogen gas to aid in removal of volatiles from fluid 312. Gas stream 324 may be fluidly coupled to housing 320. In some embodiments, gas stream 324 comprises a gas or gas mixture for reacting with fluid 312.

A plurality of vacuums 322 and/or a plurality of gas streams 324 may be coupled to housing 320. For example, a first gas stream 324 may be located near input path 304, and a second gas stream 324 may be located near output path 306. The first gas stream may be configured to remove volatiles from substrate 302, while the second gas stream may comprise a gas for reacting with fluid 312, for example. In some embodiments, gas streams 324 are configured to direct gas directly to one or more channels 212. In some embodiments, vacuums 322 and gas streams 324 are configured to run continuously. In some embodiments, vacuums 322 and gas streams 324 are configured to operate intermittently.

Also illustrated in FIG. 3B is a second substrate 326, which may be substantially similar to the first substrate 302. Multiple substrates 302, 326 may be used within a system 300 to allow for multiple flow chemistry processes to proceed in parallel. Alternatively, or additionally, fluid from first substrate 302 may be directed to second substrate 326 to mix with a different fluid (i.e., first substrate 302 may be in fluid connection with second substrate 326). In some embodiments, second substrate 326 is stacked atop first substrate 302. By stacking substrates 302, 326, heat from heating device 318 may heat both substrates such that a single heating device 318 can be used to heat a plurality of substrates for volatile removal. Thus, the efficiency of removing volatiles from a plurality of microfluidic devices is improved. In some embodiments, the substrates 302, 326 may line within the same horizontal plane. Thus, in some embodiments, heating device 318 is in direct contact with a plurality of substrates.

Figure 4:
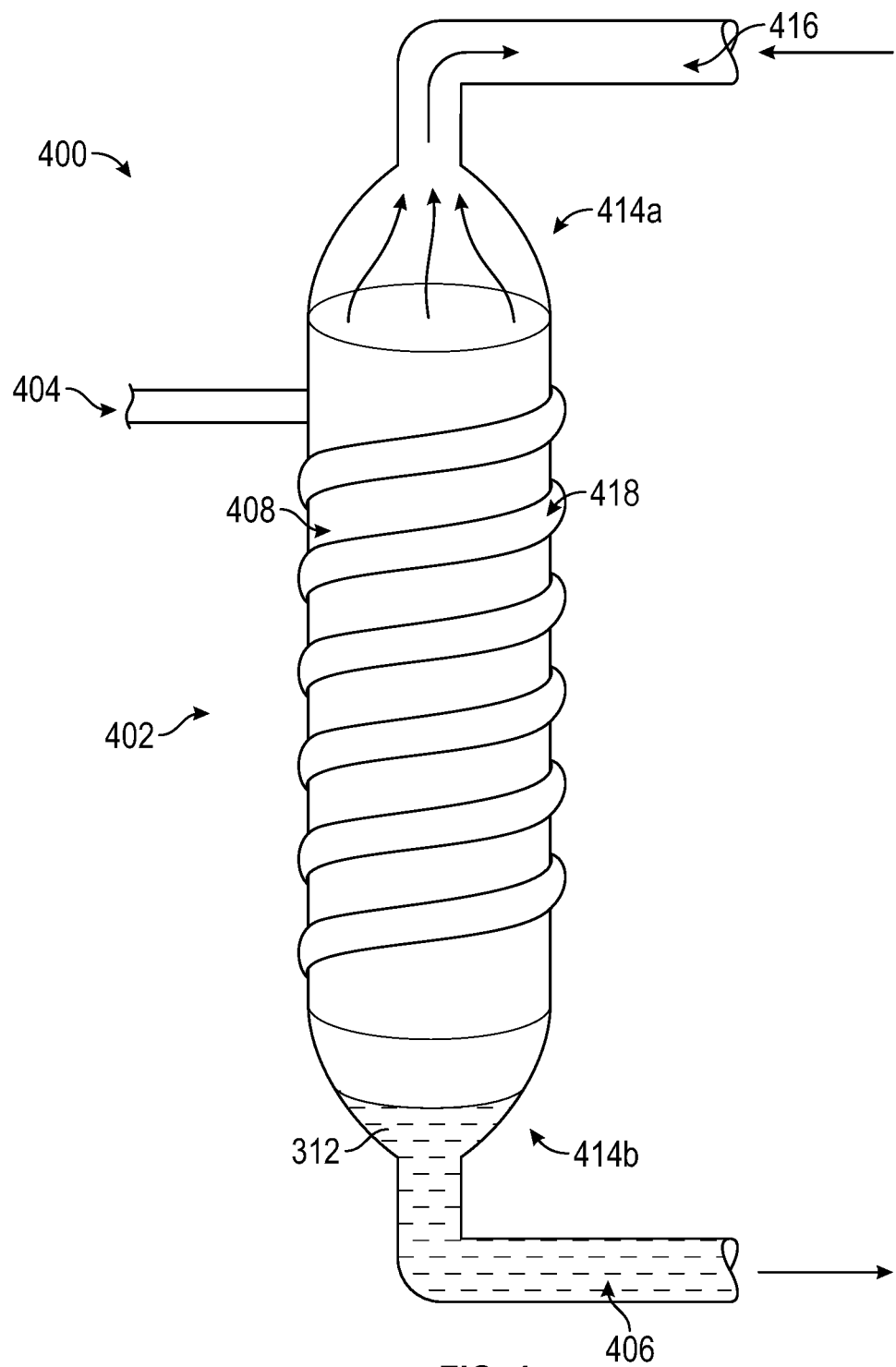
FIG. 4 illustrates a second system for microfluidic fluid evaporation for some embodiments.

FIG. 4 illustrates a planar view of a system 400 for microfluidic film evaporation using a femtosecond laser-patterned surface for some embodiments. System 400 may comprise a substrate 402 comprising an input path 404, an output path 406, and a FLPS 408 extending from input path 404 to output path 406. Differing from system 300, in system 400, substrate 402 comprises a columnar or cylindrical shape. FLPS 408 may comprise an inner surface that is femtosecond laser patterned. As discussed above, FLPS 408 may be laser-patterned to comprise hydrophilic and/or hydrophobic properties. In some embodiments, FLPS 408 is heated by a heating device 418. In FIG. 4, heating device 418 is depicted as heating coils that are concentric with FLPS 408; however, one of skill in the art will appreciate that various heat sources may be used to heat substrate 402. Heating device 418 may extend substantially along a length of substrate 402 or may extend along a portion of substrate 402. For example, heating device 418 may have a length of about half the length of substrate 402.

In some embodiments, input path 404 is located near an upper section 414a of system 400 and output path 406 is located near a lower section 414b, such that gravity, along with the capillary action, may act on fluid 312 to pull fluid 312 to output path 406. In some embodiments, lower section 414b is shaped to catch fluid 312 and funnel fluid 312 to output path 406. For example, lower section 414b may comprise a conical or bowl-like shape to collect fluid 312 before fluid 312 bottoms out via output path 406.

In some embodiments, system 400 comprises a volatile outlet 416. Volatile outlet 416 may be located in upper section 414a and above input path 404, or at any location along substrate 402. Alternatively, as described above with respect to FIG. 3B, system 400 may be encased within a housing, and volatile outlet 416 may be formed as part of the housing. In some embodiments, a vacuum device is coupled to volatile outlet 416 to aid in removing evaporated volatiles from system 400. In some embodiments, one or more gas streams 324 are coupled to system 400. The gas stream 324 may be disposed near lower section 414b such that the gas reacts with fluid 312 after removal of all or substantially all of the volatiles therefrom. In some embodiments, gas stream 324 is located along any point along substrate 402 or coupled to a housing.

In operation, an operator may feed fluid 312 to system 400 at input path 404. When fluid 312 contacts FLPS 408, fluid 312 may be wicked into a thin film. Fluid 312 may adhere to FLPS 408 as gravity and the wicking action pulls fluid 312 from input path 404 to output path 406, whereby fluid 312 is pooled at lower section 414b before exiting system 400 via output path 406. Simultaneously, heating device 418 heats substrate 402, causing volatiles to evaporate from fluid 312. Volatiles may be removed via volatile outlet 416.

Figure 5:
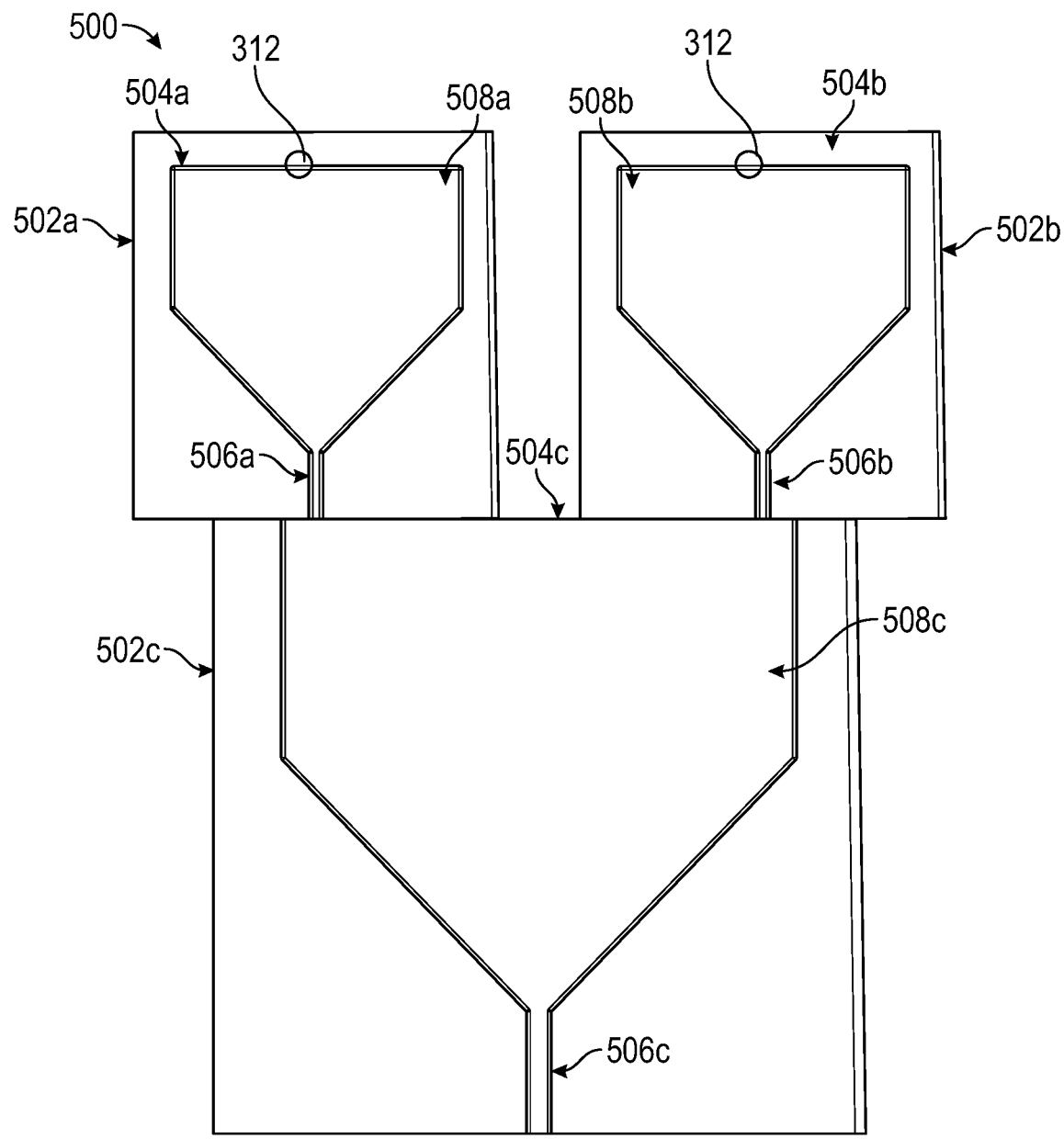
FIG. 5 illustrates an exemplary system for microfluidic fluid evaporation for some embodiments.

FIG. 5 depicts an exemplary multi-substrate microfluidic fluid evaporation system for some embodiments. In system 500, three distinct substrates are provided for a flow chemistry process. Thus, system 500 presents a first substrate 502a, a second substrate 502b, and a third substrate 502c. First substrate 502a comprises first input path 504a, first output path 506a, and first FLPS 508a. Second substrate 502b comprises second input path 504b, second output path 506b, and second FLPS 508b. Third substrate 502c comprises third input path 504c, third output path 506c, and third FLPS 508c. Substrates 502a, 502b, 502c may comprise various geometries to achieve differing flow characteristics at each substrate. For example, output paths 506a, 506b, 506c may comprise distinct widths, and substrates 502a, 502c may be superhydrophobic, while second substrate 502b is superhydrophilic.

Each substrate 502a, 502b, 502c may be heated by a distinct heating device, or two or more substrates may be heated by a single heating device. In some embodiments, one or more substrates 502a, 502b, 502c are not heated. For example, a first fluid may be deposited at first input path 504a, and a second fluid may be deposited at second input path 504b, and substrates 502a, 502b may be heated by a single heating device to remove volatiles from the first and second fluids. In some embodiments, distinct heating devices may be used to heat substrates 502a, 502b at distinct temperatures, which may be advantageous when the first fluid and the second fluid comprise volatiles that evaporate at different temperatures. The two fluids may then wick to third substrate 502c, whereby the fluids may be mixed together and proceed to third output path 506c. Because volatiles may be removed from the fluids at substrates 502a, 502b, third substrate 502c may not be heated. However, in some embodiments, it may be advantageous to heat all substrates 502a, 502b, 502c to reduce the viscosity of the fluids to increase the rate at which the fluids wick through the substrates. Additionally, third substrate 502c may be heated to continue evaporating volatiles from the fluids. Likewise, cooling may be applied to one or more substrates 502a, 502b, 502c to increase the viscosity of a fluid thereon to decrease the rate at which the fluid is wicked.

While system 500 depicts two substrates 502a, 502b feeding into a third substrate 502c, it will be appreciated that various arrangements of substrates 302, 402 may be utilized without departing from the scope hereof. For example, a mixing process could start with fluid 312 deposited at input path 404 of a columnar system 400. Output path 406 of system 400 may then feed fluid 312 to input path 304 of system 300 and, thereafter, fluid 312 travels to output path 306. The systems may comprise a shared housing coupled with various vacuums and/or gas streams. Alternatively, each substrate may have a dedicated housing and, an output path of a first system in a first housing may be fluidly coupled to an input path of a second system in a second housing.

As shown, system 500 comprises substrates 502a, 502b, 502c arranged vertically; however, it will be appreciated that the substrates in a system 500 may be arranged in any orientation. For example, substrate 502a, 502b, 502c may be arranged in-line horizontally. As another example, a columnar system 400 oriented vertically may feed into a horizontally oriented chip system 300. In some embodiments, the substrates may be supported by an angled supporting structure, such as a structure arranged at a 45 degree angle, thereby orienting the substrate at a 45 degree angle such that gravity helps pull fluid to the output path. Thus, embodiments herein provide systems for microfluidic fluid evaporation that enables mixing of fluids in-line and for product work-up to purify compounds, wherein the systems are highly configurable based on the inputs and desired output of the mixing process.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

The invention claimed is:

1. A system for microfluidic film evaporation, the system comprising:
   a femtosecond laser-patterned substrate, comprising:
     one or more femtosecond laser-patterned input paths for receiving at least one fluid; and
     one or more femtosecond laser-patterned output paths,
     wherein the femtosecond laser-patterned substrate causes the at least one fluid to wick from the one or more femtosecond laser-patterned input paths to the one or more femtosecond laser-patterned output paths, and
     wherein the at least one fluid wicks in a thin film along a top surface of the femtosecond laser-patterned substrate; and
   a heating device for heating the femtosecond laser-patterned substrate, thereby evaporating volatiles from the at least one fluid.

2. The system of claim 1, wherein the femtosecond laser-patterned substrate comprises at least one of a superhydrophobic region or a superhydrophilic region.

3. The system of claim 1, wherein the femtosecond laser-patterned substrate is formed from a material selected from the group consisting of: glass, silicon nitride, and stainless steel.

4. The system of claim 1, wherein the system further comprises a vacuum for removing volatiles from the femtosecond laser-patterned substrate.

5. The system of claim 1,
   wherein the system further comprises a gas stream to add gas to the femtosecond laser-patterned substrate to react with the at least one fluid.

6. The system of claim 1,
wherein the at least one fluid comprises a first fluid and a second fluid, and
wherein the one or more femtosecond laser-patterned input paths comprises a first input path configured to wick the first fluid and a second input path configured to wick the second fluid, and
wherein the femtosecond laser-patterned substrate is patterned to connect the first input path to the second input path to mix the first fluid with the second fluid.

7. The system of claim 1,
wherein the femtosecond laser-patterned substrate is at least partially surrounded by an exterior surface, and
wherein the exterior surface comprises a wetting property distinct from a wetting property of the femtosecond laser-patterned substrate.

8. The system of claim 1,
wherein the femtosecond laser-patterned substrate is a first femtosecond laser-patterned substrate, and
wherein the one or more femtosecond laser-patterned output paths are configured to feed into one or more femtosecond laser-patterned input paths of a second femtosecond laser-patterned substrate.

9. The system of claim 1,
wherein the femtosecond laser-patterned substrate is a first femtosecond laser-patterned substrate, and
wherein the system further comprises:
a second femtosecond laser-patterned substrate and a third femtosecond laser-patterned substrate, and
wherein the one or more femtosecond laser-patterned output paths of the first femtosecond laser-patterned substrate and one or more femtosecond laser-patterned output paths of the second femtosecond laser-patterned substrate are fluidly connected to one or more femtosecond laser-patterned input paths of the third femtosecond laser-patterned substrate.

10. The system of claim 1,
wherein the femtosecond laser-patterned substrate comprises a first side wall opposite a second side wall,
wherein the first side wall and the second side wall are angled to converge to form the one or more femtosecond laser-patterned output paths.

11. A method for microfluidic film evaporation for removal of volatiles, comprising:
providing at least one femtosecond laser-patterned substrate, comprising:
one or more femtosecond laser-patterned input paths; and
one or more femtosecond laser-patterned output paths,
wherein the at least one femtosecond laser-patterned substrate is patterned to wick a fluid in a thin film across a top surface of the femtosecond laser-patterned substrate and from the one or more femtosecond laser-patterned input paths to the one or more femtosecond laser-patterned output paths; and
providing heating for the at least one femtosecond laser-patterned substrate to heat the fluid and evaporate volatiles from the fluid.

12. The method of claim 11, further comprising providing a vacuum to remove volatiles from the at least one femtosecond laser-patterned substrate.

13. The method of claim 11, further comprising providing a gas stream, the gas stream coupled to the at least one femtosecond laser-patterned substrate to add gas to the femtosecond laser-patterned substrate and to react with the fluid.

14. The method of claim 11,
wherein the fluid is a first fluid, and
wherein at least one of the one or more femtosecond laser-patterned output paths are fluidly connected to one or more femtosecond laser-patterned input paths of an additional substrate, the additional substrate comprising a second fluid for mixing with the first fluid.

15. A microfluidic film evaporation system, comprising:
at least one fluid;
a fluid input path;
a volatiles outlet;
a fluid output path;
a cylindrical femtosecond laser-patterned surface extending between the fluid input path and the fluid output path,
wherein the cylindrical femtosecond laser-patterned surface wicks the at least one fluid in a thin film along an inner surface of the cylindrical femtosecond laser-patterned surface and from the fluid input path to the fluid output path; and
a heating coil coupled to an exterior of the cylindrical femtosecond laser-patterned surface,
wherein, when the at least one fluid is heated by the heating coil, volatiles are evaporated from the at least one fluid and removed via the volatiles outlet.

16. The microfluidic film evaporation system of claim 15, wherein the microfluidic film evaporation system further comprises a vacuum coupled to the volatiles outlet to remove the volatiles via the volatiles outlet.

17. The microfluidic film evaporation system of claim 15, wherein the cylindrical femtosecond laser-patterned surface comprises a superhydrophobic section.

18. The microfluidic film evaporation system of claim 15, wherein the cylindrical femtosecond laser-patterned surface comprises a superhydrophilic section.

19. The microfluidic film evaporation system of claim 15, wherein the cylindrical femtosecond laser-patterned surface is vertically-oriented.

20. The microfluidic film evaporation system of claim 15, further comprising:
a gas stream coupled to a channel of the cylindrical femtosecond laser-patterned surface.

* * * * *